Aug. 3, 1926. 1,595,041
E. L. WALSH
DEVICE FOR EFFECTING AUTOMATIC LUBRICATION OF INTERNAL
COMBUSTION ENGINES
Filed April 2, 1926
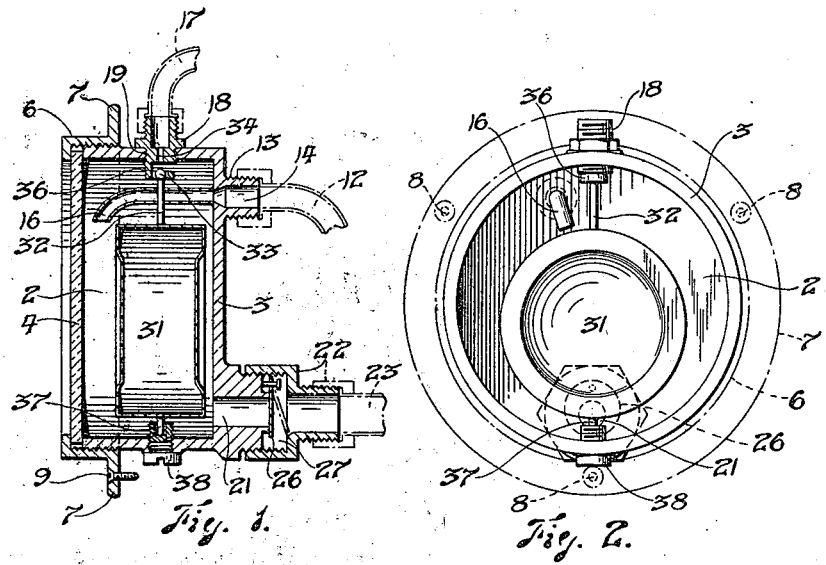
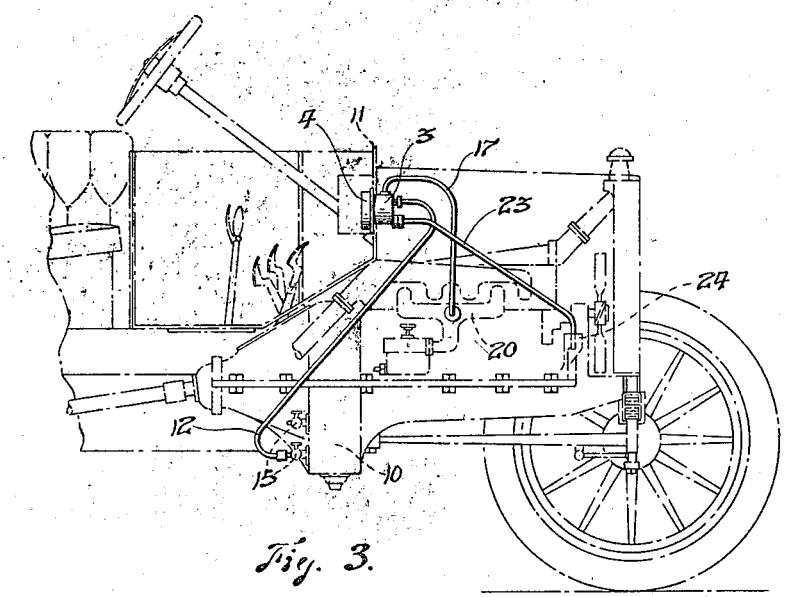
Inventor:
Edward Loftus Walsh
By
Attorney.

Patented Aug. 3, 1926.

1,595,041

UNITED STATES PATENT OFFICE.

EDWARD LOFTUS WALSH, OF BRUNSWICK, VICTORIA, AUSTRALIA, ASSIGNOR TO THE VISIBLE VACUUM OILER COMPANY PROPRIETARY LIMITED, OF MELBOURNE, AUSTRALIA.

DEVICE FOR EFFECTING AUTOMATIC LUBRICATION OF INTERNAL-COMBUSTION ENGINES.

Application filed April 2, 1926, Serial No. 99,321, and in Australia February 20, 1925.

This invention relates to the automatic lubrication of internal combustion engines and more particularly to the lubrication of automobile engines of a certain type as hereinafter referred to. The invention is however applicable to the automatic lubrication of internal combustion engines in general.

According to present general practice internal combustion engines are lubricated usually by the force feed system in which pumps are utilized to force the lubricating oil to the various parts desired, or by the "splash" system wherein the movement of certain internal parts, such for instance as the cranks or connecting rod ends, causes the oil in the crank case or sump to be splashed over the various internal parts of the engine.

A certain well known make of automobile engine is, however, lubricated by a method according to which the engine flywheel and associated electromagnets revolving within an oil sump or compartment at the rear part of the engine are caused to lift the oil therefrom and drop it into an internal funnel from which a delivery pipe carries the oil by gravity to the opposite or front end of the engine where it is introduced into the front crank case compartment and then gravitates back along the bottom of the crank case to the sump or flywheel compartment from which it was originally taken. The bottom of the crank case beneath each crank is provided with a depression or trough in which the oil collects and is splashed upwardly onto the bearings and other working parts by the cranks or connecting rod ends.

An objection to that method of lubrication is that the funnel and delivery pipe through which the oil is conveyed to the forward part of the engine are liable to blockage or obstruction by the entrance thereinto of foreign matter such as fibrous material which is thrown off by the fibrous brake band lining which is associated with the transmission gearing adjacent the flywheel which revolves in the oil sump or compartment as before mentioned. This fibrous material and other foreign matter such for instance as small particles of metal frequently enter the aforesaid funnel of the oil delivery pipe and choke or obstruct the latter so that the proper supply of oil is not delivered to the front part of the engine; and owing to the fact that the said oil delivery pipe and funnel are concealed within the engine, the blockage or obstruction cannot be detected until the bearings become overheated, thus frequently resulting in serious damage before the defect can be remedied.

The primary object of the present invention is to overcome the above mentioned disadvantages and to provide improved means for automatically lubricating internal combustion engines whereby the various parts will be positively and continuously oiled while the engine is running and without the aid of oil pumps.

The improved means operate on the principle that the suction of the engine is utilized to create a vacuum whereby the oil from a compartment such as the crank case or sump is raised to an elevation from which it gravitates through a delivery pipe or pipes to the desired part or parts of the engine, provision being made to obviate the breaking down of the vacuum owing to the admission of the air through said oil delivery pipe.

In a preferred constructional embodiment of the invention the elevated chamber is formed by a casing adapted for mounting above the engine and having an observation window or the like whereby the lubricant entering and passing through the chamber on its way to the parts or elements of the engine to be lubricated, is readily visible so that the operator or person in control of the engine can ascertain instantly, and without any trouble, how lubrication is proceeding.

Referring to the drawings which form part of this specification:—

Figure 1 is a vertical section of a device, according to a practical embodiment of the invention, for automatically lubricating internal combustion engines and for affording visible indication of the flow of the lubricant from the device to the parts or elements of the engine requiring lubrication.

Figure 2 is a front view of the device, a cap or cover which fits over the front thereof being indicated in broken lines.

Figure 3 is a fragmentary side view of an automobile and showing an automatic lubricating device in accordance with the invention operatively applied to the engine.

A device in accordance with the invention includes a vacuum chamber 2 which may be formed by a casing 3 composed of transparent material such as glass. In the preferred embodiment the casing 3 is composed of metal and is provided at its open front with an observation window 4 of glass or the like whereby the interior of the vacuum chamber 2 is visible from the front of the device. The observation window or glass front 4 may be removably retained in position by a cap 6 screwing onto the front portion of the casing 3. If desired jointing rings or washers may be inserted between the window 4 and the casing or the cap to ensure an air tight joint.

The casing 3, with its transparent front closure as aforesaid, is mounted in a suitable elevated position relative to the crank case or compartment from which the oil is to be drawn. For instance, the cap 6 or the casing 3 may be provided with an outstanding flange 7 provided with holes 8 to pass screws 9 whereby the device may be mounted on the dash or instrument board 11 of an automobile (as in Figure 3) where it is continuously under the observation of the driver.

The said vacuum chamber 2 is placed into communication with the lower part of the engine crank case 10, or with any other receptacle or compartment from which the lubricating oil is to be delivered to the various working parts of the engine, by an oil supply pipe 12. The upper end portion of said oil supply pipe is preferably connected to a nipple 13 outstanding from the upper part of the casing 3, around an oil inlet opening 14, and a supply pipe extension 16 may extend from said nipple within the vacuum chamber to a point near the observation window 4 where the pipe extension may be bent downwardly. In applying the device to an automobile of the well known make referred to, the lower end of the oil supply pipe 12 may be connected to the lowermost of a pair of "pet" cocks 15 which usually outstand from the lower part of the engine crank case 10, or, if desired, said lowermost "pet" cock may be removed and the oil supply pipe screwed into the existing hole formed in the crank case for said cock.

To establish a vacuum in the vacuum chamber the latter is connected by a suction pipe 17 with the intake manifold 20 or any other suitable part of the engine, whereby air may be exhausted from the vacuum chamber 2 to induce oil thereinto from the aforesaid supply pipe 12. This suction pipe may be connected at one end to a tubular nipple 18 which screws into an air exhaust opening 19 formed in the upper part of the casing 3. The suction pipe may be provided with a suitable regulating tap or valve if so desired.

An oil outlet opening 21 is formed through the casing 3 at or near the bottom thereof, and suitable pipe fittings 22 are provided for connecting thereto an oil delivery pipe or pipes 23 which may extend to any desired position to which it is required to deliver the oil. For instance a delivery pipe may extend to the breather opening 24 where the lubricating oil is usually introduced into the engine crank case at the front part of the latter so that it may gravitate back along the bottom of the crank case to the oil sump or flywheel compartment as previously mentioned. If desired the oil delivery pipe may have branches for conducting oil directly to bearings or to other elements requiring lubrication.

In order to obviate breaking down of the vacuum in the vacuum chamber a suitable device such for instance as a non-return valve 26 is adapted to control the entrance from the vacuum chamber to the oil delivery pipe 23 so that the establishment of the vacuum in the vacuum chamber normally tends to close said non-return valve which is opened only by the weight of oil above the non-return valve pressing against the latter. This non-return valve may be of the flap valve type and mounted within a valve chamber 27 formed by a pipe fitting or connection 22 at the upper end portion of the oil delivery pipe 23 where it connects to the bottom of the vacuum chamber. The arrangement is such that the non-return valve 26 normally closes and prevents the air being drawn through the oil delivery pipe or pipes into the vacuum chamber but, when a relatively small quantity of oil has accumulated within the vacuum chamber, the said valve is opened by the weight of the oil which thus escapes from the vacuum chamber to the delivery pipe 23 by which it is conveyed to the desired position, the body of oil above the non-return valve acting to seal the entrance to the delivery pipe 23 when the non-return valve is thus open.

If desired valve means may be provided to automatically cut off or close the vacuum chamber 2 to the suction pipe 17 in the event of the oil rising within the vacuum chamber to a predetermined level, thus preventing additional oil being induced by suction through the supply pipe 12 into the vacuum chamber. Such cut off valve is preferably operated by medium of a float 31 disposed within the vacuum chamber, said float having an upstanding stem 32 provided at its upper end with a ball, cone or like valve element 33 arranged in alignment with a suitable valve seating 34 formed in the nipple 18 which connects the suction pipe 17 to the vacuum chamber. The rising and falling motion of the valve float 31 may be guided by means of an apertured extension 36 depending from the said nipple 18 so as to freely surround the valve stem 32 and valve 33, while a guide pin or stem 37 depending from the bottom of the float 31 may be freely accommodated within a guide member 38 screwed into the bottom of the casing 3 diametrically opposite the nipple 18.

The outlet end portion of the aforesaid extension 16 of the oil supply pipe 12 may be bent so that the oil issuing therefrom falls between the observation window 4 and the front face of the float 31 whereby the visibility of the oil flow will be accentuated.

In operation the engine suction creates a vacuum in the vacuum chamber 2, thus inducing oil from the crank case, sump or other position through pipe 12 into the elevated vacuum chamber, from which latter the oil passes out by gravity through the delivery pipe or pipes 23 to the desired point or points from which the surplus oil may be returned by gravity to the sump or compartment from which it was originally drawn. By the provision of a non-return valve 26 as above mentioned, the induction of air through the oil delivery pipe 23 into the vacuum chamber, and consequent breaking down of the vacuum in the latter, is positively prevented while at the same time the oil is permitted to pass freely from the vacuum chamber. Furthermore, by providing for the visibility of the oil issuing from the oil supply pipe extension 16 into the vacuum chamber, the driver of a vehicle can see readily from the driver's seat how lubrication is proceeding.

It will be understood that it is not essential that the suction pipe 17 and the oil supply and delivery pipes 12—23 should be connected to the engine at the precise positions before described or as illustrated in Figure 3, and that the points of connection between the said pipes and the engine may be selected as will be most suitable to the particular engine to which the device is to be applied or to other circumstances.

The invention provides a highly effective, simple and inexpensive arrangement for the automatic lubrication of internal combustion engines without the aid of oil pumps or other relatively expensive and unreliable automatic lubricating devices as at present employed.

A device in accordance with the invention may also be advantageously employed on internal combustion engines equipped with forced feed, pump operated or other lubricating systems, for the purpose of affording visible indication to the driver or person in control of the amount of oil in the lubricating system and to give visible warning before the amount of oil in the system diminishes to a dangerous extent. In such an application the vacuum chamber 2 may be mounted on an elevated instrument board or the like and operatively connected to the engine so that oil is raised by suction from the lower part of the sump or crank case through the oil supply pipe 12 into the vacuum chamber 2 from which the oil may be delivered by the oil delivery pipe 23 back into the lower part of the sump or crank case. The amount of oil in the lubricating system may be readily ascertained by observing the flow of oil from the oil supply pipe 12, into the vacuum chamber 2 of the device, such flow obviously decreasing as the oil in the lubricating system diminishes. Furthermore, owing to the visibility of the oil flow through the vacuum chamber 2, the device may also serve to indicate the presence of any foreign matter in the oil.

Having now described my invention what I claim as new and desire to secure by Letters Patent is:—

1. A device for effecting automatic lubrication of internal combustion engines, comprising, in combination, a casing providing an internal vacuum chamber, a transparent front for the casing; said casing having an oil outlet opening formed near its bottom, and air outlet and oil inlet openings formed above said oil outlet opening; outlet and inlet oil pipes connected to said openings, a float disposed within the casing, a valve operable by said float to close and open said air outlet opening as the oil level within the casing rises and falls, and an extension on said oil inlet pipe projecting inwardly into the vacuum chamber and having its outlet end portion so disposed that oil issuing therefrom falls between said transparent front or window and said float.

2. A lubricating device for automobile engines, comprising a casing having an air exhaust opening in its top, and a tubular nipple fitted therein; an air exhaust pipe connected to said nipple; oil supply and delivery pipes connected to said casing; an apertured guide connected to the nipple and disposed within the casing; a guide mounted in the bottom of the casing diametrically opposite the first guide; a float within said casing having oppositely-located upper and lower stems slidably engaged in said guides; and a valve member on the upper stem for opening and closing the passage through the nipple during the movements of the float.

In testimony whereof I hereunto affix my signature.

E. L. WALSH.